United States Patent
Doyle et al.

(10) Patent No.: US 10,961,466 B2
(45) Date of Patent: Mar. 30, 2021

(54) PURIFICATION OF RENEWABLE OILS

(71) Applicants: Michael P. Doyle, Carmel, CA (US); Glenn Richards, Bakersfield, CA (US)

(72) Inventors: Michael P. Doyle, Carmel, CA (US); Glenn Richards, Bakersfield, CA (US)

(73) Assignee: Basis Energy Purification, LLC, Reno, NV (US)

( * ) Notice: Subject to any disclaimer, the term of this patent is extended or adjusted under 35 U.S.C. 154(b) by 0 days.

(21) Appl. No.: 16/047,009

(22) Filed: Jul. 27, 2018

(65) Prior Publication Data
US 2019/0031964 A1    Jan. 31, 2019

Related U.S. Application Data

(60) Provisional application No. 62/537,554, filed on Jul. 27, 2017.

(51) Int. Cl.
*C10G 31/10* (2006.01)
*C10G 53/02* (2006.01)

(52) U.S. Cl.
CPC ............. *C10G 31/10* (2013.01); *C10G 53/02* (2013.01); *C10G 2300/1011* (2013.01)

(58) Field of Classification Search
CPC ................................. C11B 3/16; C10G 31/10
See application file for complete search history.

(56) References Cited

U.S. PATENT DOCUMENTS

| 2,205,971 | A | * | 6/1940 | Clayton | C11B 3/06 554/189 |
| 6,844,458 | B2 | * | 1/2005 | Copeland | A23D 9/00 554/175 |
| 2007/0039853 | A1 | * | 2/2007 | Angulo Aramburu | C10M 175/0016 208/179 |
| 2007/0208187 | A1 | * | 9/2007 | Tysinger | A23D 9/02 554/8 |
| 2017/0015938 | A1 | * | 1/2017 | Xiao | C11B 3/16 |

FOREIGN PATENT DOCUMENTS

WO        WO-9600273 A1 *  1/1996  .......... C10M 175/00

* cited by examiner

*Primary Examiner* — Philip Y Louie
*Assistant Examiner* — Alyssa L Cepluch
(74) *Attorney, Agent, or Firm* — Christopher Darrow

(57) ABSTRACT

A Process for the purification of renewable oils. The process may also be applied to petroleum oils such as used motor oil and the like. The process involves centrifuging the renewable oil in a centrifugal device producing a minimum of 7000 RCF, then contacting the oil with a mixture containing water, a straight chain hydro-treated ester compound, and a phosphate derivative at a minimum temperature of 100° C. for 10 minutes, then raising temperature to approximately between 120° C. and 130° C. to complete reaction. The mixture is then again centrifuged in a centrifugal device producing a minimum of 7000 RCF.

3 Claims, 1 Drawing Sheet

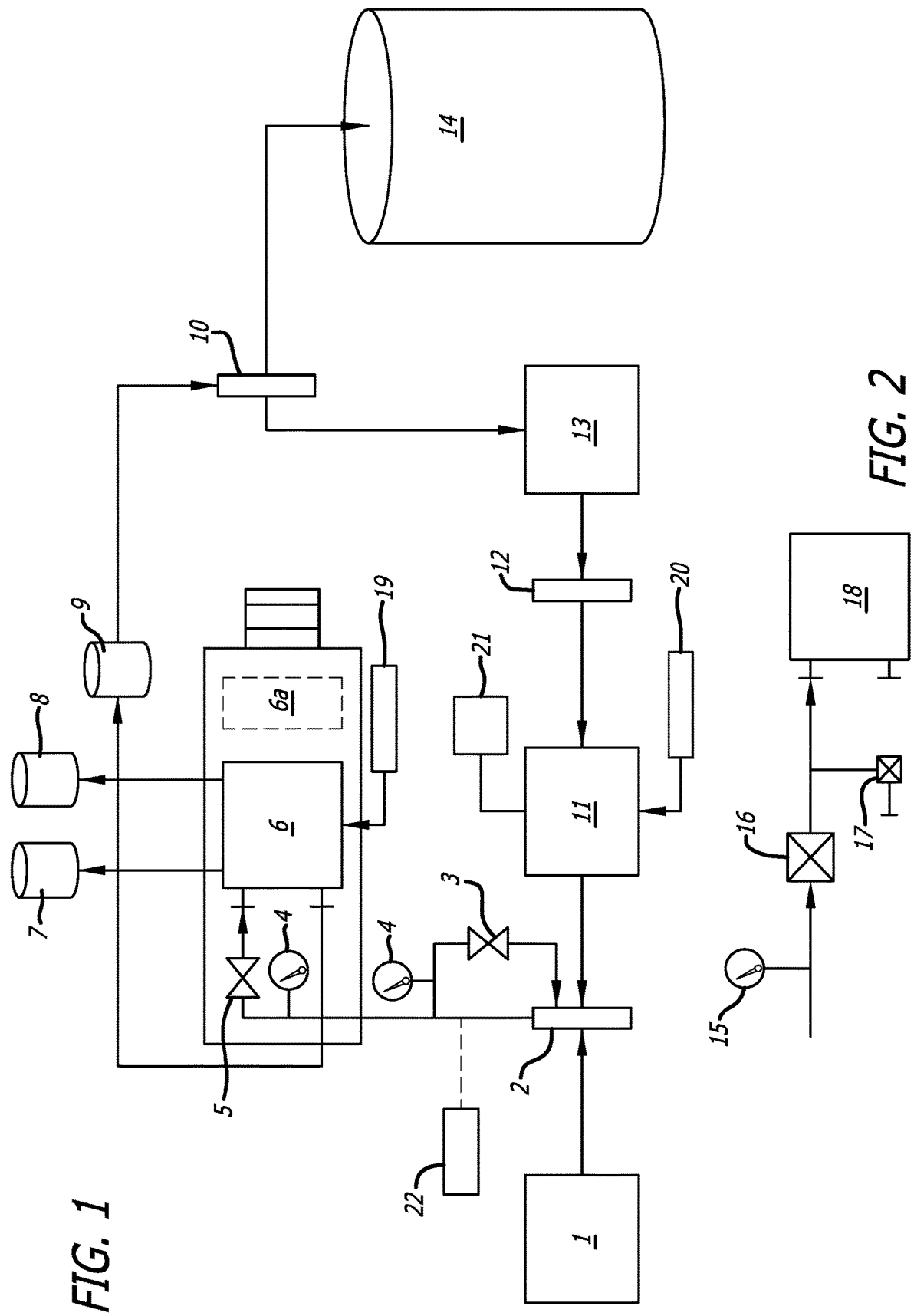

PURIFICATION OF RENEWABLE OILS

CROSS-REFERENCES TO RELATED APPLICATIONS

This application claims priority from provisional Application No. 62/537,554, filed Jul. 27, 2017, incorporated by reference in its entirety.

BACKGROUND

Field of Invention

The present novel invention relates to a process for the extreme purification of renewable oils used to make renewable fuels such as animal fats/oils and various seed based oils, soy, rapeseed, palm, especially those seed oils that have been collected after use to prepare food, commonly known as Used Cooking Oil (UCO). These oils can contain deleterious material, gums, metals, sulfur, ash, water and other undesirable materials that interfere with the conversion process to renewable fuels or as feedstock for use in the chemical industry or other conversion processes where high purity is required. Having this level of purity prolongs catalyst life in processes, reduces corrosion in plant processes, and requires less conversion chemicals to reach the end goal of a process.

The present invention relates to processes for removing undesirable materials, sulfur, and ash, including one or more metals, water, unsaponifiable matter, free fatty acid, insoluble impurities from renewable oils. More particularly, the invention relates to such processes that are capable of extreme purification of these oils.

Renewable Oils are defined as seed based and animal based. The craft process for pulping wood to make paper for example produces crude tall oil which is a renewable oil.

Seed oils can be soy oil, rapeseed oil, palm oil, camelina or other. These oils are currently in demand for the production of Biofuel, fatty acid methyl ester (FAME).

Tallow oil is a rendered form of fat, from beef, poultry, lamb, or other animals.

Tallow manufacture consists of freeing fat from its associated tissues by heat rendering and then refining it to separate it from the solids and water which would lead to its deterioration. Tallow oil (also known as "tallow") is used in animal feed, to make soap, shoe polish, for cooking and as a bird food. It can be used as a raw material for the production of biodiesel and other chemicals. Tallow also has a history of use as a lubricant for machinery as well as for ammunition. In addition to fat, tallow typically contains parts per million levels of a variety of minerals or metals. In one particular study, the level of such minerals was found to range from about 10-20 ppm sodium, 2-3 ppm potassium, 1-2 ppm calcium, 0.4-0.5 ppm iron, 1.1-1.2 ppm lead, 0.4 to 0.5 ppm magnesium, 0.070 ppm cadmium, 0.025 to 0.055 ppm zinc, 0.8 to 1.0 ppm chromium. Ali, Pakistan *JOURNAL OF NUTRITION* 7 (5) 717-720, 2008.

Prior Art

Conventionally, water acid degumming is used to remove phosphatides from vegetable oils and animal oils/fats. This process is being used as part of biodiesel manufacturing plant. In this process oil is heated up to about 70-90° C. followed by mixing of 0.05 to 0.1% phosphoric acid in a Continuous Stirrer Tank Reactor (CSTR). The residual acid is neutralized in subsequent CSTR by mixing with caustic followed by removal of gums by centrifugation and water washing. The process requires huge quantity of water for water washing and its disposal. Caustic used for neutralization of residual phosphoric acid also reacts with free fatty acids present in oils and fats and forms stable emulsion which is very difficult to break and requires longer time. The process is not suitable for removal of trace metals below 20 ppm.

U.S. Pat. No. 3,879,282 discloses a method for reducing ash and lead in motor oils. The method requires elevated temperature and pressure, does not address sulfur reduction and does not disclose the use of high gravity force centrification. Further, this invention and how it is applied will not work on triglyceride based oils as the method will convert the triglyceride oils to soap.

U.S. Pat. No. 5,239,096 disclosed a process for reducing non-hydratable gums and wax content in edible oils. The process involves mixing with 0.01 to 0.08% acid (in the form 10-15% aqueous solution), adding 1-5% base solution followed by slow mixing for 1-4 hrs, separating gums and water washing of oil. As discussed above the process will suffer due to drawbacks of water washing and neutralization steps.

U.S. Pat. No. 6,407,271 disclosed a method for eliminating metals from fatty acid substances and gum associated with said metals. Method comprises mixing of vegetable oil with aqueous solution of salt of polycarboxylic acid (Sodium salt of ethylenediaminetetraacetic acid, EDTA) in the droplets or micelles in the weight ratio above 3. The aqueous phase is separated from oil by centrifuging or ultra filtration. Process uses very expensive chemicals and huge quantity of water about 33% of vegetable oil.

U.S. Pat. No. 6,844,458 disclosed improved refining method for vegetable oils. In this method, aqueous organic acid and oil subjected to high and low shear followed by centrifuge to remove gums. As cited in examples process uses about 10% water of oil quantity to dilute the acid solution and treated oil still contain about 20 ppm of metals.

U.S. Pat. No. 7,494,676 disclosed a pretreatment process comprising of a) enzymatic degumming with or without citric acid and sodium hydroxide b) bleaching with 2-4%) bleaching earth and 0-1% activated carbon c) dewaxing at low temperature of 18-20° C. with gentle stirring for about 12-18 hrs to achieve <5 ppm phosphorous. The process uses up to 2.5% of water and centrifuge for separation of gums. As described above, caustic react with free fatty acids present in oil and fats and forms stable emulsion which is very difficult to break and require longer time. The complete process takes very long time of about 15-20 hrs. Hence the size of dewaxing vessel will be huge and also require high energy for stirring. Moreover, process did not discuss the removal of other metals such as Fe, Cu, Na, K, Ca, Mg etc. present in the oil.

U.S. Pat. Application No. 2013/0197251 discloses a treatment method involving the mixture of phosphoric acid and citric acid and clay to reduce metals. This disclosure does not discuss which type of clay (there are hundreds) is used. This disclosure is based around not requiring water washing and not requiring centrifuging, but the use of counter current washing to minimize the use of clay.

U.S. Pat. No. 8,912,351 discloses a method of metals reduction using Ionic liquids. The reduction of sulfur is not looked at nor is high gravity force centrification.

What is not disclosed in any of the prior art and what is needed in the industry is a method to reduce sulfur, nitrogen, metals, ash and other impurities to a very low level and do this in a very economical manner in a continuous plant environment and able to be scaled to high output levels to supply a petroleum refinery. This is the basis for our invention. All other methods including existing RBD (capital intensive) are not practical.

SUMMARY OF THE INVENTION

The present invention provides a simple and cost effective method to substantially reduce sulfur, metals and other impurities in renewable oils and used motor oil. Renewable oils are those defined as coming from the rendering of animals (tallow), from seed crops such as rapeseed, soy, corn, palm and others. These oils can also be treated after use such as from used cooking oil (UCO) which is a seed oil used for frying foods. The process may also be applied to petroleum oils such as used motor oil and the like. The process involves first mixing the oil with a citric acid aqueous solution at 60° C. and then centrifuging the material in a centrifugal device producing a minimum of 7000 RCF to remove gums, then contacting the oil with a mixture containing water, a straight chain hydro-treated ester compound, and a phosphate derivative at a minimum temperature of 100° C. for 10 minutes, then raising temperature to between 120° C. and 130° C. for approximately 30 to 90 minutes to complete reaction. The mixture is then allowed to cool and again centrifuged in a centrifugal device producing a minimum of 7000 RCF.

BRIEF DESCRIPTION OF THE DRAWINGS

FIG. 1 is a chart depicting the flow of material being processed according to this disclosure and the steps performed on the material to produce the resultant product.

FIG. 2 is a chart depicting an alternate configuration of a portion of the process shown in FIG. 1 of components 4 through 6.

DETAILED DESCRIPTION OF THE PREFERRED EMBODIMENTS

FIGS. 1 and 2 show the components and steps of the process that achieve the results of this novel and nonobvious process. The combination of these steps yields a result that was surprising to the inventors. The numbered items are as follows.

1. Centrifuge feed tank (supply)
2. Centrifuge feed pump
3. Needle valve (controls flow)
4. Pressure gage
5. Throttle valve
6. First centrifuge
6a. Second centrifuge
7. Solids (sludge) tank
8. Water phase tank
9. Transfer tank
10. Transfer pump
11. Reactor
12. Transfer pump
13. Centrifuged product tank
14. Finished product tank
15. Pressure gage
16. Throttle valve
17. Sample port
18. Centrifuge
19. Optional water injector
20. Phosphate derivatives injector
21. Vacuum device
22. Plate heat exchanger The process involves first centrifuging the renewable oil or petroleum based oil in a centrifugal device producing a minimum of 7000 RCF. The temperature of the oil is the temperature at which maximum insolubility of the oil and impurities is determined (about 130° F.), but is determined by prior laboratory work using steps as are known to persons of ordinary skill in the art. This first step pre-conditions the oil and removes larger impurities that will interfere with the reaction in step two. Step two, the oil (96.7%) is then contacted with a mixture containing water (1 to 3%), a straight chain hydro-treated ester compound (0.1 to 0.5%), and a phosphate derivative (0.01 to 0.06%) at a minimum temperature of 100° C. for a minimum of 10 minutes under reduced pressure, then raising temperature to between 120° C. and 130° C. for approximately 30 to 90 minutes under reduced pressure to complete reaction. At this point, a precipitate is formed which is a salt form of all or most of the impurities. To remove these impurities, step three, the mixture is then allowed to cool and again centrifuged in a centrifugal device which produces a minimum of 7000 RCF. This oil is then checked for compliance to the required specification.

Referring to FIG. 1, the oil to be purified (renewable such as a poultry, beef, corn, used cooking oil (UCO) or a petroleum based oil such as a used motor oil) enters the centrifuge feed tank 1. A citric acid aqueous solution may be added to the oil to be purified. This feed tank 1 also controls temperature and consistency (mixing) to the first centrifuge 6. For example, the centrifuge feed tank may raise the temperature of the oil to 60° C. From this tank 1, centrifuge feed pump 2 delivers the oil through needle valve 3 (which controls flow) to the first centrifuge 6. Pressure gage 4 monitors the pressure. Throttle valve 5 adds additional control by applying back pressure to the first centrifuge 6 adjusting the position of the phases within the centrifuge 6. The first centrifuge 6 produces in excess of 7000 RCF (relative centrifugal force). This step is for pre-treatment and may include injecting water or a citric acid aqueous solution into the oil to remove sludge (non-oil components) via an optional water injector 19. The first centrifuge 6 separates the non-oil components and any water discharging these to disposal, solids 7 and water 8. The centrifuged oil leaves the first centrifuge 6 entering the transfer tank 9. Then transfer pump 10 moves the oil to the centrifuged product tank 13. Transfer pump 12 moves the product to the reactor 11. While in the reactor 11, phosphate derivatives are added via phosphate derivatives injector 20. The oil is held in the reactor 11 as the temperature is raised to approximately 130° C. and held for approximately 30 minutes to form the precipitates of the metals. A vacuum is also applied to remove any water vapor with vacuum device 21. After this allotted time, transfer pump 2 feeds the oil to the first centrifuge 6 through plate heat exchanger 22 to reduce the temperature to between approximately 60° C. to 72° C. The first centrifuge 6 is thereby utilized twice in a batch operation. Plate heat exchanger 22 is used only for material coming out of reactor 11. In a continuous process, transfer pump 2, or a parallel pump, feeds second centrifuge 6a through plate heat exchanger 22 so as to not interfere with the operation of first centrifuge 6. The routing of piping and the placement valves in a continuous process would be known to persons of ordinary skill in the art. The precipitate from either first centrifuge 6 or second centrifuge 6a (depending on whether a batch or continuous process is employed) exits through the sludge line 7, and no water should be present. The centrifuged oil is then stored in final product tank 14. Finally, the oil now in the finished product tank 14 is water washed as in the pre-treatment step to neutralize the phosphate derivative.

FIG. 2 breaks out a portion of FIG. 1 to show additional detail regarding pressure gage 15, throttle valve 16, sample port 17 and centrifuge 18. The functions of these items were previously described with respect to items 4, 5 and 6, with sample port 17 added as an optional item.

Prepare a solution as follows. Into each one liter of feedstock oil add a mixture of 100 ml water to which has been added 2 gm to 6 gm citric powder depending on the quantity of gums in the oil. Heat this total mixture to approximately 60° C. and mix for approximately 15 min. Then centrifuge at 7,000 RCF to 12,000 RCF to remove gums and particulates. Place the centrifuged feedstock into a 2 liter glass beaker, with stir bar, onto a stirring hot plate equipped with a temperature control probe.

Heat the feedstock to 50° C. Separately, prepare a solution 0.5 to 5.0 gm of diammonium phosphate (DAP) in 20 cc of water in a 30 ml vial. The DAP will dissolve into the water. The amount of DAP (i.e. 0.5 to 5 gr) is a decision made based on level of treatment required. Add the DAP solution to the heated feedstock and increase the oil temperature to 100° C. while stirring. Hold for 15 minutes while water evaporates, use vigorous mixing. Then raise the temperature to 130° C. to 150° C. and hold for 90 minutes.

Then remove the beaker form the heat source and allow to cool to under 45° C. Then add 20 gm of a nitrogen absorption catalyst such as BASF F24X or 25X and continue stirring for 30 minutes. Then turn off stir bar and decant oil off into centrifuge tubes or run through a high speed centrifuge at 7,000 RCF to 12,000 RCF to remove particulates and the catalyst granules.

If needed, heat the treated oil to 60° C. and filter through a 1 micron micro-glass filter to remove particulates not already removed by the centrifuge operation.

The feedstock is then tested for residual nitrogen, metals, insolubles, ash, sulfur and other tests as required.

Reasonable variation and modification are possible within the scope of the foregoing disclosure, the drawing and the appended claims of the invention, the essence of which is that there has been provided a method for purifying renewable oils. Numerous variations and improvements are possible by those skilled in the art. Therefore, the claims define the inventions, which are not limited to the disclosure above.

We claim:

1. A process for the purification of renewable oils and petroleum oils comprising the steps:
   providing a feedstock comprising a renewable oil, a petroleum oil, or a combination thereof;
   centrifuging the feedstock in a centrifugal device producing a minimum of 7000 RCF;
   contacting the centrifuged feedstock with a mixture containing water and diammonium phosphate and heating to a temperature high enough to evaporate the water and holding that temperature until the water evaporates;
   raising the temperature to between approximately 120° C. and 130° C. for approximately 30 to 90 minutes;
   allowing the mixture to cool below 120° C.;
   centrifuging the resultant mixture in a centrifugal device producing a minimum of 7000 RCF, whereby precipitates are separated from the resultant mixture to produce a resultant oil; and
   collecting the resultant oil in a container.

2. A process for the purification of renewable oils or petroleum oils, comprising the steps:
   providing a feedstock oil comprising a renewable oil, a petroleum oil, or a combination thereof;
   depositing the feedstock oil into a feed tank;
   determining by prior lab work the temperature range at which maximum insolubility of the oil and impurities occurs and maintaining this range in the feed tank, thereby producing a first resultant material;
   feeding the first resultant material to a first centrifuge;
   the first centrifuge producing at least 7000 RCF wherein non-oil components are separated from oil components;
   discharging the non-oil components from the centrifuge;
   moving the oil components to a transfer tank;
   transferring the oil components to a reactor;
   adding diammonium phosphate to the oil components in the reactor producing a second resultant material;
   maintaining the temperature of the second resultant material in the reactor at 130° C. for 30 minutes to allow formation of precipitates of any metals occurring in the oil components thereby producing a third resultant material;
   in a batch process, transferring the third resultant material to the first centrifuge or in a continuous process, transferring the third resultant material to a second centrifuge, wherein the first centrifuge or the second centrifuge separates the precipitates, and
   removing the precipitates whereby purified oil remains.

3. A process for the purification of renewable oils or petroleum oils, comprising the steps:
   providing a feedstock oil comprising a renewable oil, a petroleum oil, or a combination thereof;
   depositing the feedstock oil into a feed tank;
   adding to the feed tank a citric acid aqueous solution;
   determining by prior lab work the temperature range at which maximum insolubility of the oil and impurities occurs and maintaining this range in the feed tank, thereby producing a fourth resultant material;
   feeding the fourth resultant material in the feed tank to a first centrifuge;
   the first centrifuge producing at least 7000 RCF wherein non-oil components are separated from oil components;
   discharging the non-oil components from the centrifuge leaving a fifth resultant material;
   moving the fifth resultant material to a transfer tank;
   transferring the fifth resultant material to a reactor;
   adding diammonium phosphate to the fifth resultant material in the reactor producing a sixth resultant material;
   maintaining the temperature of the sixth resultant material in the reactor at 130° C. for 30 minutes to allow formation of precipitates of any metals occurring in the oil components;
   in a batch process, transferring the sixth resultant material to the first centrifuge or in a continuous process, transferring the sixth resultant material to a second centrifuge, wherein the first centrifuge or the second centrifuge separates out the precipitates, and
   removing the precipitates whereby purified oil remains.

* * * * *